United States Patent
Yu et al.

(10) Patent No.: US 10,326,586 B2
(45) Date of Patent: Jun. 18, 2019

(54) ENCRYPTION/DECRYPTION APPARATUS AND POWER ANALYSIS PROTECTING METHOD THEREOF

(71) Applicant: Winbond Electronics Corp., Taichung (TW)

(72) Inventors: Chun-Yuan Yu, Taichung (TW);
Szu-Chi Chung, Taichung (TW);
Sung-Shine Lee, Taichung (TW);
Hsie-Chia Chang, Taichung (TW);
Chen-Yi Lee, Taichung (TW)

(73) Assignee: Winbond Electronics Corp., Taichung (TW)

( * ) Notice: Subject to any disclaimer, the term of this patent is extended or adjusted under 35 U.S.C. 154(b) by 214 days.

(21) Appl. No.: 15/456,589

(22) Filed: Mar. 13, 2017

(65) Prior Publication Data
US 2017/0302435 A1    Oct. 19, 2017

(30) Foreign Application Priority Data
Apr. 19, 2016 (CN) .......................... 2016 1 0242072

(51) Int. Cl.
*G06F 11/30*   (2006.01)
*H04L 9/00*    (2006.01)
(Continued)

(52) U.S. Cl.
CPC ............ *H04L 9/003* (2013.01); *G06F 21/602* (2013.01); *G06F 21/72* (2013.01); *H04L 9/12* (2013.01)

(58) Field of Classification Search
CPC ......... H04L 9/003; H04L 9/12; G06F 21/602; G06F 21/72
(Continued)

(56) References Cited

U.S. PATENT DOCUMENTS 6,415,032 B1 * 7/2002 Doland ................ H04L 9/0662
380/255
6,419,159 B1    7/2002 Odinak
(Continued)

FOREIGN PATENT DOCUMENTS

CN    102509036    6/2012
CN    102710413    10/2012
(Continued)

OTHER PUBLICATIONS

"Office Action of Taiwan Counterpart Application," dated May 15, 2017, p. 1-p. 4.
(Continued)

*Primary Examiner* — Mohammad W Reza
(74) *Attorney, Agent, or Firm* — JCIPRNET

(57) ABSTRACT

An encryption/decryption apparatus and a power analysis protecting method thereof are provided. The encryption/decryption apparatus adapted to perform encryption/decryption operation on digital data includes a data encryption/decryption unit, a random number generator, and a power analysis protecting circuit. The data encryption/decryption unit receives the digital data and performs an encryption/decryption operation on the digital data. The random number generator is used to generate random number data, the random number data has N bits, and N is a positive integer. The power analysis protecting circuit generates M kinds of power signals having different levels according to each bit data of the random number data when the random number data is received by the power analysis protecting circuit, and M is equal to the $N^{th}$ power of 2.

9 Claims, 3 Drawing Sheets

(51) Int. Cl.
*G06F 21/60* (2013.01)
*G06F 21/72* (2013.01)
*H04L 9/12* (2006.01)

(58) Field of Classification Search
USPC .......................................................... 713/189
See application file for complete search history.

(56) References Cited

U.S. PATENT DOCUMENTS

| | | |
|---|---|---|
| 8,522,052 B1 | 8/2013 | Lesea |
| 2007/0233762 A1* | 10/2007 | Sudhakar ................ G06F 7/582 |
| | | 708/250 |
| 2008/0212776 A1 | 9/2008 | Motoyama |
| 2012/0159187 A1 | 6/2012 | Liu et al. |
| 2015/0195082 A1 | 7/2015 | Han et al. |

FOREIGN PATENT DOCUMENTS

| | | |
|---|---|---|
| JP | 2003527790 | 9/2003 |
| TW | 200823926 | 6/2008 |
| TW | 201225613 | 6/2012 |
| TW | 201437910 | 10/2014 |

OTHER PUBLICATIONS

Office Action of Japan Counterpart Application, dated May 15, 2018, pp. 1-5.

\* cited by examiner

ENCRYPTION/DECRYPTION APPARATUS AND POWER ANALYSIS PROTECTING METHOD THEREOF

CROSS-REFERENCE TO RELATED APPLICATION

This application claims the priority benefit of China application serial no. 201610242072.6, filed on Apr. 19, 2016. The entirety of the above-mentioned patent application is hereby incorporated by reference herein and made a part of this specification.

BACKGROUND OF THE INVENTION

Field of the Invention

The invention relates to an encryption/decryption technique, and specifically relates to an encryption/decryption apparatus capable of protecting against power analysis attack and a power analysis protecting method thereof.

Description of Related Art

Encryption/decryption technique is commonly used to ensure the security of information transmission. In the classical encryption technique, firstly, an information (plain text) is encrypted at a transmitting end, and an information (cipher text) is decrypted or decoded at a receiving end. Such information encryption or decryption is commonly known as the encryption/decryption technique.

Encryption/decryption algorithms have been broadly used in wireless communication systems such as a wireless local area network, near field communication, data storage system, and bank system, but there still exist malicious tools to crack the encryption/decryption algorithms. The side-channel attack refers to an action that attempts to crack the encryption/decryption system based on physical analysis and implementation analysis of the system. For example, the information in the encryption/decryption system, such as power consumption, electromagnetic wave, time difference, etc., can possibly be helpful to crack the system.

Wherein, the differential power analysis attack exploits the power information leaking from a channel when hardware performs encryption and decryption to derive a secret key. The differential power analysis attack may be performed by measuring power consumption (power signal) of a password complier, for example, or a smart card that receives power externally, for example, wherein current consumption of the smart card may depend on a gate switching determined by an operation currently being executed. A hacker can monitor power consumption of the smart card and exploits the statistical information to infer information related to sensitive data when the smart card is manipulated. Therefore, how to effectively protect against power analysis attack is, in fact, a key point that those skilled in this technical field concern about.

SUMMARY OF THE INVENTION

The invention provides an encryption/decryption apparatus and a power analysis protecting method thereof that are capable of protecting against power analysis attack effectively and do not affect speed and efficiency of an encryption/decryption operation.

The encryption/decryption apparatus of the invention is adapted to perform an encryption/decryption operation on digital data and includes a data encryption/decryption unit, a random number generator, and a power analysis protecting circuit. The data encryption/decryption unit receives the digital data and performs the encryption/decryption operation on the digital data. The random number generator is configured to generate random number data, the random number data has N bits, and N is a positive integer. The power analysis protecting circuit generates M kinds of power signals having different levels according to each bit data of the random number data when the random number data is received by the power analysis protecting circuit, and M is equal to the $N^{th}$ power of 2.

In one embodiment of the invention, when the data encryption/decryption unit does not perform the encryption/decryption operation, the encryption/decryption apparatus controls to disable the random number generator, so as to make the power analysis protecting circuit stop operating.

The power analysis protecting method of the invention is applied to an encryption/decryption apparatus. The power analysis protecting method includes: generating random number data, wherein the random number data has N bits, and N is a positive integer; and starting a power analysis protecting circuit according to the random number data, so as to make the power analysis protecting circuit generate M kinds of power signals having different levels according to each bit data of the random number data when the random number data is received by the power analysis protecting circuit, wherein M is equal to $N^{th}$ power of 2.

Based on the above, the encryption/decryption apparatus of the invention can exploit the variation in the random number data to dynamically change the power consumption (power signal), which is generated in the process of operating encryption/decryption, for each clock cycle, so it is difficult for the attacker to derive information (such as the secret key) related to sensitive data according to the power consumption. Furthermore, the power analysis protecting circuit and the data encryption/decryption unit are independently disposed, so as to avoid affecting the speed and the efficiency of the encryption/decryption operation, and the power analysis protecting circuit appropriately stops operating according to whether the execution of the encryption/decryption operation is performed or not, so the unnecessary power consumption is reduced.

In order to make the aforementioned and other features and advantages of the invention more comprehensible, embodiments accompanying figures are described in detail belows.

DESCRIPTION OF THE EMBODIMENTS

Figure 1:
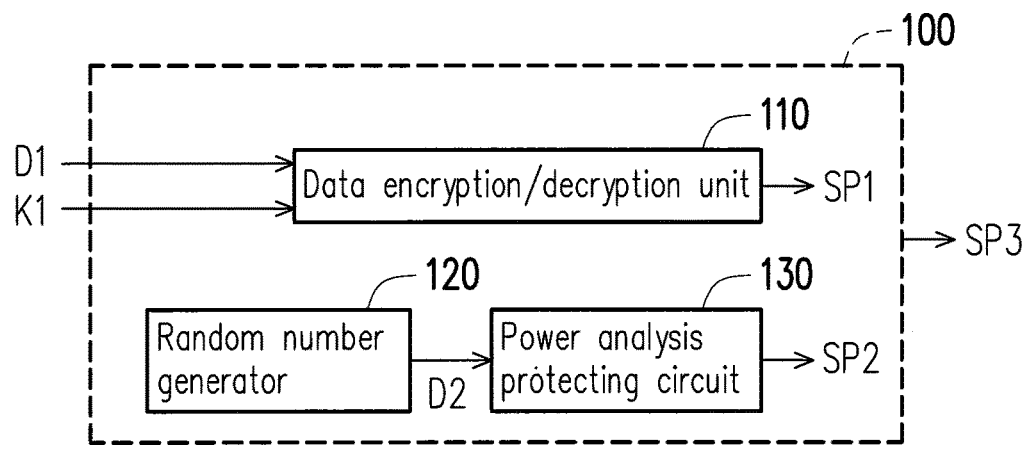
FIG. 1 is a schematic view depicting an encryption/decryption apparatus of one embodiment of the invention.

Firstly, FIG. 1 is referred to, FIG. 1 is a schematic view depicting an encryption/decryption apparatus of one embodiment of the invention. In the present embodiment, the encryption/decryption apparatus 100 may be, for example, a password chip and includes a data encryption/decryption unit 110, a random number generator 120, and a power analysis protecting circuit 130. When the digital data D1 is inputted to the encryption/decryption apparatus 100, the data encryption/decryption unit 110 can receive the digital data D1 and perform the encryption/decryption operation on the digital data D1. The encryption/decryption operation is, for example, in accordance with the encryption standard, such as data encryption standard (DES), 3-DES, or advanced encryption standard (AES), etc. The data encryption/decryption unit 110 generates a power signal SP1 in the process of encryption/decryption operation.

Figure 2:
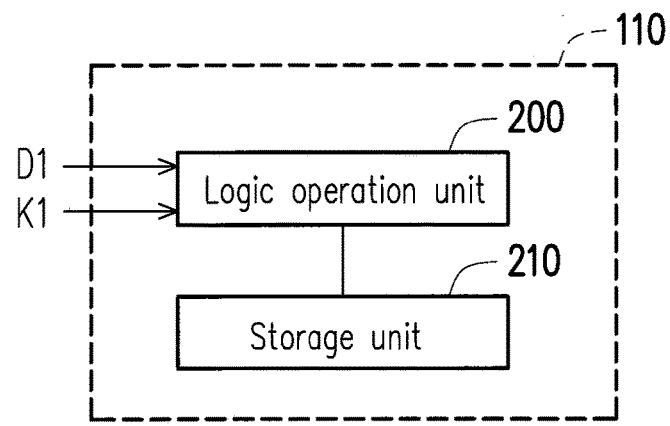
FIG. 2 is a schematic view depicting a data encryption/decryption unit of one embodiment of the invention.

As an example, FIG. 2 is a schematic view depicting a data encryption/decryption unit of one embodiment of the invention. As shown in FIG. 2, the data encryption/decryption unit 110 includes a logic operation unit 200 and a storage unit 210. The logic operation unit 200 can receive a secret key K1 and the digital data D1, then perform a logic operation on the digital data D1 according to the secret key K1, and can perform permutation for the digital data D1 by exploiting a digital data permutation table stored in the storage unit 210, so as to execute the encryption/decryption operation. It should be noted here, the structure and function of the data encryption/decryption unit as aforementioned are only in an exemplary embodiment, the invention is not limited thereto.

Returning to FIG. 1, the random number generator 120 can generate a different random number data D2 in each clock cycle. The random number data D2 is, for example, a real random number data, and each random number data D2 has N bits (N is a positive integer). The power analysis protecting circuit 130 is coupled to the random number generator 120, and the random number generator 120 can receive the random number data D2. The power analysis protecting circuit 130 generates M kinds of power signals SP2 having different levels according to each bit data in the random number data D2 when the random number data D2 is received by the power analysis protecting circuit 130 (M is equal to the $N^{th}$ power of 2). Wherein, the magnitude of N is decided/determined according to actual demands, the greater magnitude of N is determined, the greater protecting reliability of the power analysis attack is achieved, but the cost is also higher.

When the attacker measures the power consumption of the encryption/decryption apparatus 100 in the present embodiment, a power signal SP3 that can be measured is a sum of the power signal SP1 and the power signal SP2, hence the power signal SP3 has $2^N$ kinds of mixed variations having different levels in each clock cycle, so it is difficult for the attacker to derive information (such as the secret key) related to sensitive data by exploiting the power consumption.

Figure 3:
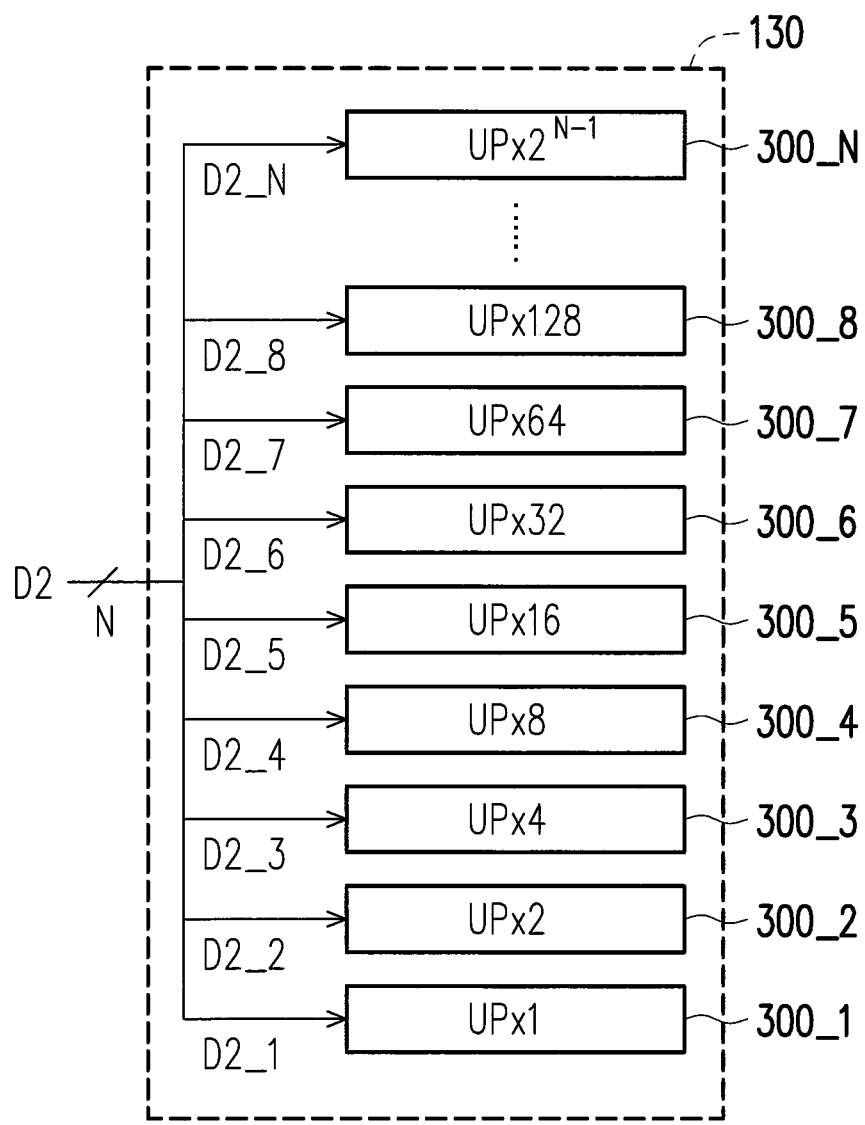
FIG. 3 is a schematic view depicting a power analysis protecting circuit of one embodiment of the invention.

As an example, FIG. 3 is a schematic view depicting a power analysis protecting circuit of one embodiment of the invention. As shown in FIG. 3, the power analysis protecting circuit 130 can includes N power signal generators 300_1~300_N, each of the power signal generators 300_1~300_N respectively receives each of bit data D2_1~D2_N of the random number data D2, so as to generate the power signals having different power levels. Take the power signal generator 300_1 as an example, when the received bit data D2_1 is a logic 0, the power signal generator 300_1 can stop operating and does not generate any power signal. When the received bit data D2_1 is a logic 1, the power signal generator 300_1 can generate a power signal having a specific level (such as unit power UPx1).

There is a certain proportional relationship between the power signals that are respectively generated by the power signal generators 300_1~300_N. To be more specific, the power signals generated by the power signal generators 300_1~300_N can be set by multiplying the unit power UP by a power of 2. In other words, the power signal (unit power UPx2) generated by the power signal generator 300_2 may be two times greater than the power signal (unit power UPx1) generated by the power signal generator 300_1, and the power signal generated by the $n^{th}$ power signal generator 300_n is equal to the unit power UP times the $(n-1)^{th}$ power of 2 (n is a positive integer, and $1 \leq n \leq N$). In other words, each of the power signal generators 300_1~300_N in the power analysis protecting circuit 130 can be determined whether to be started according to the respective bit data D2_1~D2_N received as a logic 0 or logic 1, and when being started, each of the power signal generators 300_1~300_N generates a respective power signal having a specific power level. In addition, when the data encryption/decryption unit 110 does not perform the encryption/decryption operation, the encryption/decryption apparatus 100 can control to disable the random number generator 120 via a disable signal, for example, so each of the power signal generators 300_1~300_N is not started and the power analysis protecting circuit 130 stops operating, and the unnecessary power consumption is reduced.

In order to further describe the present embodiment, the following Table (1) shows a circumstance that N is equal to 3, the starting situation of the power signal generators 300_1~300_3 in the power analysis protecting circuit 130, and the generated power signals SP2.

TABLE 1

| Random number data D2 (D2_3, D2_2, D2_1) | Started power signal generator | Power signal SP2 |
|---|---|---|
| 000 | None | 0 |
| 001 | 300_1 | Unit power UPx1 |
| 010 | 300_2 | Unit power UPx2 |
| 011 | 300_1, 300_2 | Unit power UPx3 |
| 100 | 300_3 | Unit power UPx4 |
| 101 | 300_1, 300_3 | Unit power UPx5 |
| 110 | 300_2, 300_3 | Unit power UPx6 |
| 111 | 300_1, 300_2, 300_3 | Unit power UPx7 |

As shown in Table 1, the power analysis protecting circuit 130 generates 8 ($2^3$) kinds of power signals SP2 with different level combinations according to 3 bits of the random number data. Generally, the power analysis protecting circuit 130 generates $2^N$ kinds of power signals SP2 with different level combinations in each clock cycle according to N bits of the random number data D2.

It should be noted here, in the present embodiment, the random number generator 120 and the power analysis protecting circuit 130 in the encryption/decryption apparatus 100 are completely independent from the data encryption/decryption unit 110, so as to avoid affecting the speed and the efficiency of the data encryption/decryption unit 110. From another viewpoint, the random number generator 120 and the power analysis protecting circuit 130 of the present embodiment can be adapted to be integrated with any kinds of the encryption/decryption apparatus, so as to have a high applicability.

Figure 4:
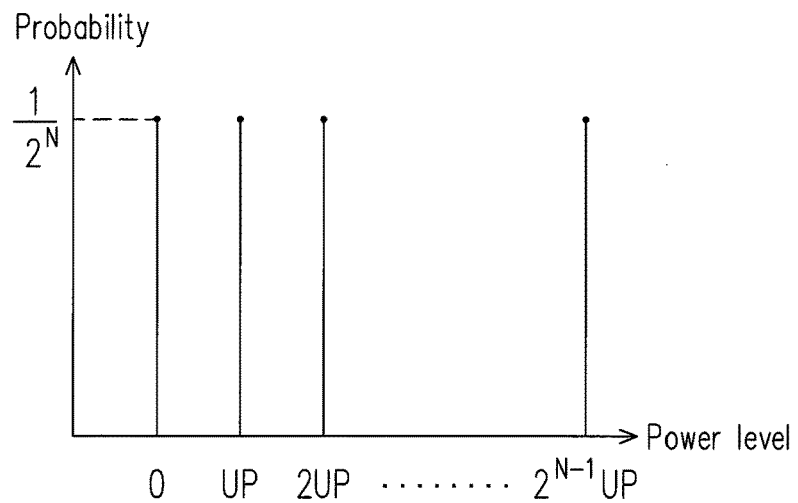
FIG. 4 is a graph depicting a relation between probability and power level in a power analysis protecting circuit of one embodiment of the invention.

FIG. 4 is a graph depicting a relation between probability and power level in a power analysis protecting circuit of one embodiment of the invention. Wherein, the horizontal axis in FIG. 4 is used to represent the power level of the power signal SP2 generated by the power analysis protecting circuit 130, and the vertical axis is used to represent the probability that the power level is generated. When the power analysis protecting circuit 130 is triggered by the random number data D2 to start, as shown in FIG. 4, the power analysis protecting circuit 130 can generate $2^N$ kinds of power levels (such as 0, UP~$2^{N-1}$UP) with different level combinations, and the probability of generating each of power levels is equal to $\frac{1}{2}^N$.

Figure 5:
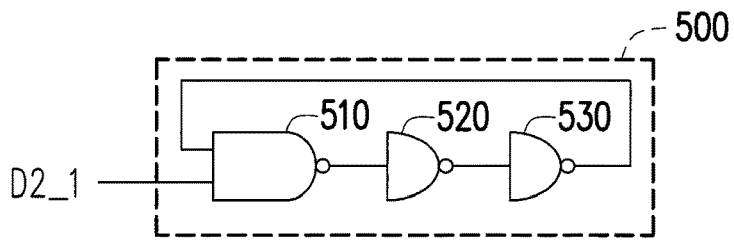
FIG. 5 is a schematic diagram depicting a power signal generator of one embodiment of the invention.

Referring to FIG. 5, FIG. 5 is a schematic diagram depicting a power signal generator of one embodiment of the invention. The power signal generators 300_1~300_N may be, for example, a structure adopting ring oscillators. As shown in FIG. 5, for example, the power signal generator 300_1 may include a ring oscillator 500. The ring oscillator 500 may include a NAND gate 510, a first inverter 520, and a second inverter 530. A first input terminal of the NAND gate 510 receives a corresponding bit data D2_1 in the random number data D2. An input terminal of the first inverter 520 is coupled to an output terminal of the NAND gate 510. An input terminal of the second inverter 530 is coupled to an output terminal of the first inverter 520, and an output terminal of the second inverter 530 is coupled to a second input terminal of the NAND gate 510. The ring oscillator 500 may be triggered by the bit data D2_1 to generate one unit power UP of the power signal.

On the other hand, the power signal generated by the power signal generator 300_2 may be two times greater than the power signal generated by the power signal generator 300_1, hence the power signal generator 300_2 may include two ring oscillators 500. The two ring oscillators 500 both are connected to the bit data D2_1 and are parallel to each other, so the two ring oscillators 500 are triggered by the bit data D2_1 to totally generate two unit powers UP of the power signal. Generally, the $n^{th}$ power signal generator 300_$n$ (n is a positive integer, and 1≤n≤N) may include $2^{n-1}$ ring oscillators 500 parallel to each other, so as to generate $2^{n-1}$ unit powers UP of the power signal.

In addition, the random number generator 120 may also be a ring oscillator based random number generator, for example. If the random number generator 120 and the power analysis protecting circuit 130 are mainly composed by the ring oscillators, it facilitate the design process to reduce cost.

Figure 6:
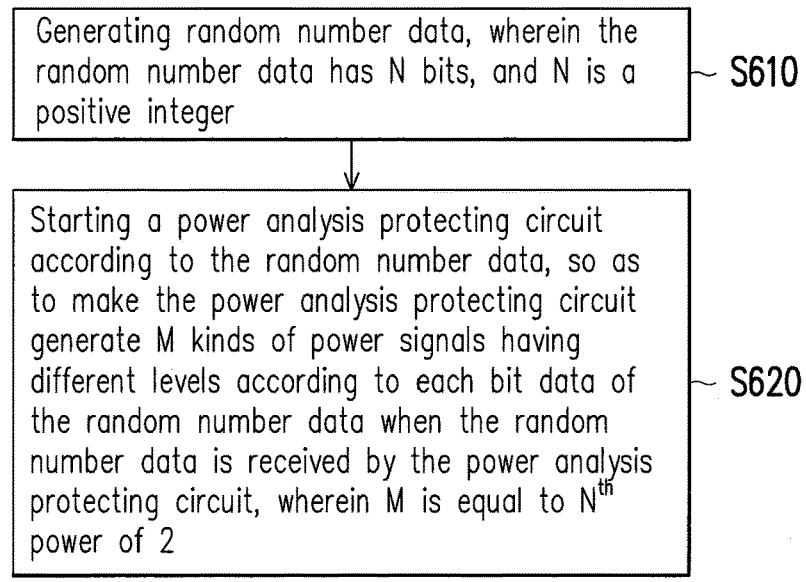
FIG. 6 is a flow chart depicting a power analysis protecting method of one embodiment of the invention.

FIG. 6 is a flow chart depicting a power analysis protecting method of one embodiment of the invention. The power analysis protecting method of the invention is applicable to the encryption/decryption apparatus 100 in FIG. 1. Referring to FIG. 1 and FIG. 6, when the encryption/decryption apparatus 100 performs the encryption/decryption operation, in step S610, the random number generator 120 generates the random number data D2. The random number data D2 has N bits, and N is a positive integer. In step S620, the encryption/decryption apparatus 100 starts the power analysis protecting circuit 130 according to the random number data D2, so as to make the power analysis protecting circuit 130 generate M kinds of power signals having different levels according to each of bit data D2_1~D2_N in the random number data D2 when the random number data D2 is received by the power analysis protecting circuit 130, wherein M is equal to $N^{th}$ power of 2.

Otherwise, in FIG. 6, the execution steps and the detailed implementation of the power analysis protecting method are comprehensively described in a plurality of aforementioned embodiments and a plurality of aforementioned examples, and will not be repeated hereinafter.

Based on the above, the encryption/decryption apparatus and the power analysis protecting method of the invention can exploit the variation in the random number data to achieve the mixed power consumption having different power levels for each clock cycle, so it is difficult for the attacker to derive information (such as the secret key) related to sensitive data according to the power consumption. Structurally, the power analysis protecting circuit and the data encryption/decryption unit are independently disposed so as to avoid affecting the speed and the efficiency of the encryption/decryption operation, and since the power analysis protecting circuit appropriately stops operating when not being used in the invention, the unnecessary power consumption is reduced.

Although the invention has been disclosed with reference to the aforesaid embodiments, they are not intended to limit the invention. It will be apparent to one of ordinary skill in the art that modifications and variations to the described embodiments may be made without departing from the spirit and the scope of the invention. Accordingly, the scope of the invention will be defined by the attached claims and not by the above detailed descriptions.

What is claimed is:

1. An encryption/decryption apparatus adapted to perform an encryption/decryption operation on digital data, the encryption/decryption apparatus comprising:
   a data encryption/decryption unit, receiving the digital data and performing the encryption/decryption operation on the digital data;
   a random number generator, configured to generate random number data, the random number data has N bits, and N is a positive integer; and
   a power analysis protecting circuit, coupled to the random number generator and generating M kinds of power signals having different levels according to each bit data of the random number data when the random number data being received by the power analysis protecting circuit, wherein M is equal to $N^{th}$ power of 2,
   wherein the power analysis protecting circuit comprises N power signal generators, each of the power signal generators respectively receives each bit data of the random number data, so as to generate the power signals having different power levels.

2. The encryption/decryption apparatus as recited in claim 1, wherein when the data encryption/decryption unit does not perform the encryption/decryption operation, the encryption/decryption apparatus controls to disable the random number generator, so as to make the power analysis protecting circuit stop operating.

3. The encryption/decryption apparatus as recited in claim 1, wherein the data encryption/decryption unit comprises:
   a logic operation unit, receiving a secret key and the digital data, and performing the encryption/decryption operation on the digital data according to the key.

4. The encryption/decryption apparatus as recited in claim 1, wherein when the received bit data is a logic 0, the power signal generator stops operating.

5. The encryption/decryption apparatus as recited in claim 1, wherein the power signal generated by the $n^{th}$ power signal generator is equal to an unit power times a $(n-1)^{th}$ power of 2, n is a positive integer, and 1<n<N.

6. The encryption/decryption apparatus as recited in claim 5, wherein the $n^{th}$ power signal generator comprises $(n-1)^{th}$ power of 2 ring oscillators, each of the ring oscillators generates one unit power of the power signal.

7. The encryption/decryption apparatus as recited in claim 6, wherein the ring oscillator comprises:
- a NAND gate, a first input terminal of the NAND gate receiving one of the corresponding bit data in the random number data;
- a first inverter, an input terminal of the first inverter being coupled to an output terminal of the NAND gate; and
- a second inverter, an input terminal of the second inverter being coupled to an output terminal of the first inverter, and an output terminal of the second inverter being coupled to a second input terminal of the NAND gate.

8. A power analysis protecting method, applied to an encryption/decryption apparatus, the power analysis protecting method comprising:
- generating random number data, wherein the random number data has N bits, and N is a positive integer; and
- starting a power analysis protecting circuit according to the random number data, so as to make the power analysis protecting circuit generate M kinds of power signals having different levels according to each bit data of the random number data when the random number data being received by the power analysis protecting circuit, wherein M is equal to $N^{th}$ power of 2,
- wherein the power analysis protecting circuit comprises N power signal generators, each of the power signal generators respectively receives each bit data of the random number data, so as to generate the power signals having different power levels.

9. The power analysis protecting method as recited in claim 8, wherein when an encryption/decryption operation is not performed, the random number data is stopped being generated, so as to make the power analysis protecting circuit stops operating.

* * * * *